United States Patent [19]

Haydon et al.

[11] 4,241,270
[45] Dec. 23, 1980

[54] SYNCHRONOUS ELECTRIC MOTOR

[75] Inventors: Arthur W. Haydon, Middlebury; John J. Dean, Oxford, both of Conn.

[73] Assignee: Tri-Tech, Inc., Waterbury, Conn.

[21] Appl. No.: 864,395

[22] Filed: Dec. 27, 1977

[51] Int. Cl.² ............................................ H02K 19/00
[52] U.S. Cl. .................................... 310/164; 310/112; 310/218; 310/259
[58] Field of Search ................ 310/49, 163, 258, 216, 310/162, 164, 156, 40 MM, 165, 112, 114, 83, 181, 172, 257, 184, 254, 218, 185, 259

[56] References Cited

U.S. PATENT DOCUMENTS

| | | | |
|---|---|---|---|
| 2,081,993 | 6/1937 | Gebhardt | 310/162 |
| 3,495,107 | 2/1970 | Haydon | 310/164 |
| 3,495,111 | 2/1970 | Haydon | 310/164 |
| 3,495,113 | 2/1970 | Haydon | 310/164 |
| 3,508,091 | 4/1970 | Kavanaugh | 310/49 |
| 3,560,775 | 2/1971 | Welter | 310/156 |
| 3,633,055 | 1/1972 | Maier | 310/156 |
| 3,770,998 | 11/1973 | Haydon | 310/164 |
| 4,004,168 | 1/1977 | Haydon | 310/164 |
| 4,034,247 | 7/1977 | Wagensonner | 310/49 R |
| 4,087,709 | 5/1978 | Haydon | 310/156 |

*Primary Examiner*—R. Skudy
*Attorney, Agent, or Firm*—Lee C. Robinson, Jr.

[57] ABSTRACT

A small two-phase motor having first and second field coils which each cooperate with a long, thin cylindrical rotor. The rotor is provided with only a single pair of nonsalient rotor poles and has a length to diameter ratio which advantageously is at least about 2.5. A stator pole piece assembly is in magnetic flux relationship with the rotor and includes first and second sets of salient stator poles which respectively cooperate with the first and second field coils. There are only two salient stator poles in each set, and the stator poles are angularly spaced apart by approximately ninety electrical degrees. In some embodiments one of the stator poles in the first set and one of the stator poles in the second set extend in opposite directions parallel to the rotor axis from a single tubular member which forms a part of the pole piece assembly.

11 Claims, 8 Drawing Figures

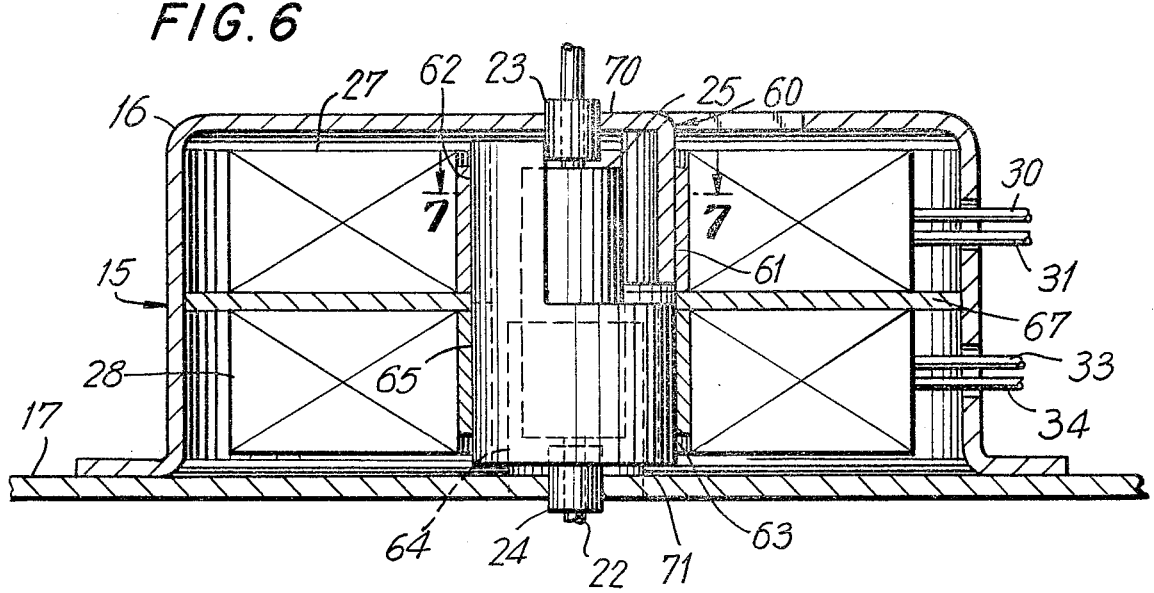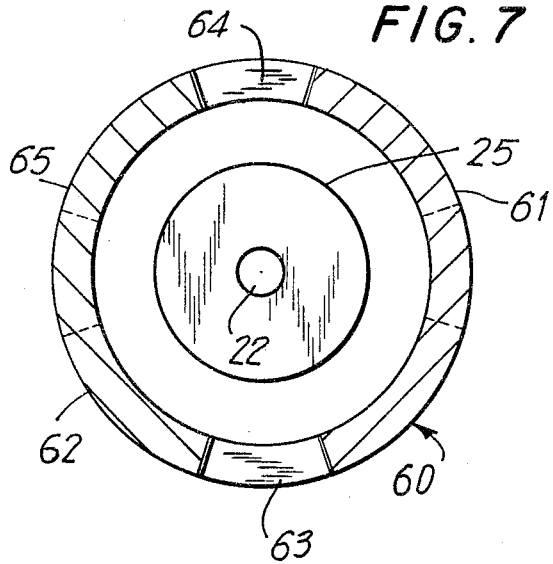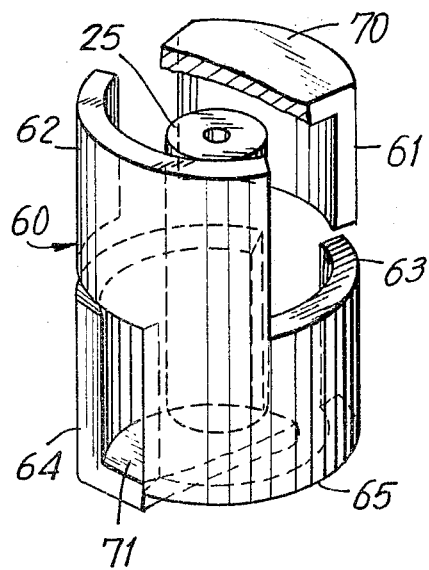

SYNCHRONOUS ELECTRIC MOTOR

BACKGROUND OF THE INVENTION

This invention relates to electric rotating machines and more particularly to two-phase electric motors having a self-starting capability.

There has been developed a line of electric motors which are small in size and yet exhibit substantial output torque. Representative motors of this type are disclosed, for example, in A. W. Haydon U.S. Pat. Nos. 3,495,113 granted Feb. 10, 1970, 3,495,111 also granted Feb. 10, 1970, 3,564,214 granted Feb. 16, 1971, 3,909,646, granted Sept. 30, 1975, and 4,004,168 granted Jan. 18, 1977; A. W. Haydon and John J. Dean U.S. Pat. No. 3,770,998 granted Nov. 6, 1973; and copending A. W. Haydon U.S. Patent Application Ser. No. 649,739 filed Jan. 16, 1976, now U.S. Pat. No. 4,087,709 granted May 2, 1978. The motors customarily are of cylindrical configuration and utilize a two pole rotor and a plurality of salient stator poles arranged around the rotor to provide a nonuniform air gap therebetween. Certain of the stator poles are shaded, and this feature, together with the nonuniform air gap, results in a motor which begins rotating substantially instantaneously in response tp the energization of the surrounding field coil.

Heretofore, attempts to operate such electric motors from a two-phase current supply commonly involved the arrangement of a pair of the motors side-by-side in a single housing. The rotors of the motors were mounted on the same shaft with one set of rotor poles displaced ninety degrees from the other set. With the stator poles of the respective motors in line with each other, the application of two-phase current to the two field coils of the assembly caused the rotors to begin rotating to drive the shaft.

Such prior attempts have not been entirely successful, however, among other reasons because of the difficulty in aligning the nonsalient poles of the two rotors in fairly precise angular relationship with each other. Additional problems encountered with two-phase motors of the type previously employed resulted from the need for providing a relatively complex stator pole structure, and the motors included an unnecessarily large number of component parts which were difficult and expensive to manufacture and assemble.

SUMMARY

One general object of this invention, therefore, is to provide a new and improved electric motor or other electric rotating machine.

More specifically, it is an object of this invention to provide a machine of the character indicated which is operable with a two-phase current supply.

Another object of the invention is to provide such a machine which retains the substantially instantaneous self-starting characteristics of the prior machines and yet eliminates the rotor alignment problems encountered heretofore.

A further object of this invention is to provide a two-phase electric motor with a simplified and efficient stator structure.

A still further object of this invention is to provide an electric rotating machine having comparatively simple mechanical and electrical components which is economical to manufacture and thoroughly reliable in operation.

In one illustrative embodiment of the invention, the machine includes a thin, cylindrical, nonsalient pole rotor having only a single pair of rotor poles. First and second field coils are coaxially disposed around the rotor in axially spaced relationship with each other and are enclosed by a housing of magnetic material. The housing also encloses a stator pole piece assembly having first and second sets of salient stator poles which respectively cooperate with the first and second coils. The stator poles are angularly spaced around the rotor with a uniform radial air gap therebetween. When two-phase current is applied to the coils, the rotor begins rotating and reaches synchronous speed substantially instantaneously.

In accordance with one feature of the invention, in certain advantageous embodiments, there are only two salient stator poles in each of the first and second sets, and the stator poles in the respective sets are angularly spaced apart by approximately ninety electrical degrees. The rotor of the machine is extremely thin and has a length to diameter ratio of at least about 2.5 to 1. The use of such a rotor in combination with only four salient stator poles avoids the rotor alignment problems of the prior machines and yet results in a motor which exhibits a substantially instantaneous self-starting characteristic in response to the application of two-phase current to the field coils.

In accordance with another feature of the invention, in several particularly important arrangements, at least two of the salient stator poles have integrally formed radial extensions in magnetic flux transmitting relationship with the cover. The arrangement is such that there is a closed return path for the magnetic flux from the rotor, with the result that for a given power input the output torque of the motor is increased.

In accordance with a further feature of some embodiments of the invention, one of the stator poles in the first set and one of the stator poles in the second set are in integral one-piece relationship with each other. These poles advantageously are fabricated from a single tubular member. The entire pole piece assembly comprises only three component parts which may be mass produced in a rapid and straightforward manner.

The foregoing and other objects, features and advantages of the invention will be more readily understood from the following description of certain preferred embodiments, when read with reference to the accompanying drawings.

BRIEF DESCRIPTION OF THE DRAWINGS

FIG. 6 is a vertical sectional view of a two-phase electric motor in accordance with another illustrative embodiment of the invention.

FIG. 7 is a fragmentary sectional view taken along the line 7—7 in FIG. 6.

FIG. 8 is a perspective view of the stator pole piece assembly for the motor of FIGS. 6 and 7.

DESCRIPTION OF CERTAIN PREFERRED EMBODIMENTS

Figure 1:
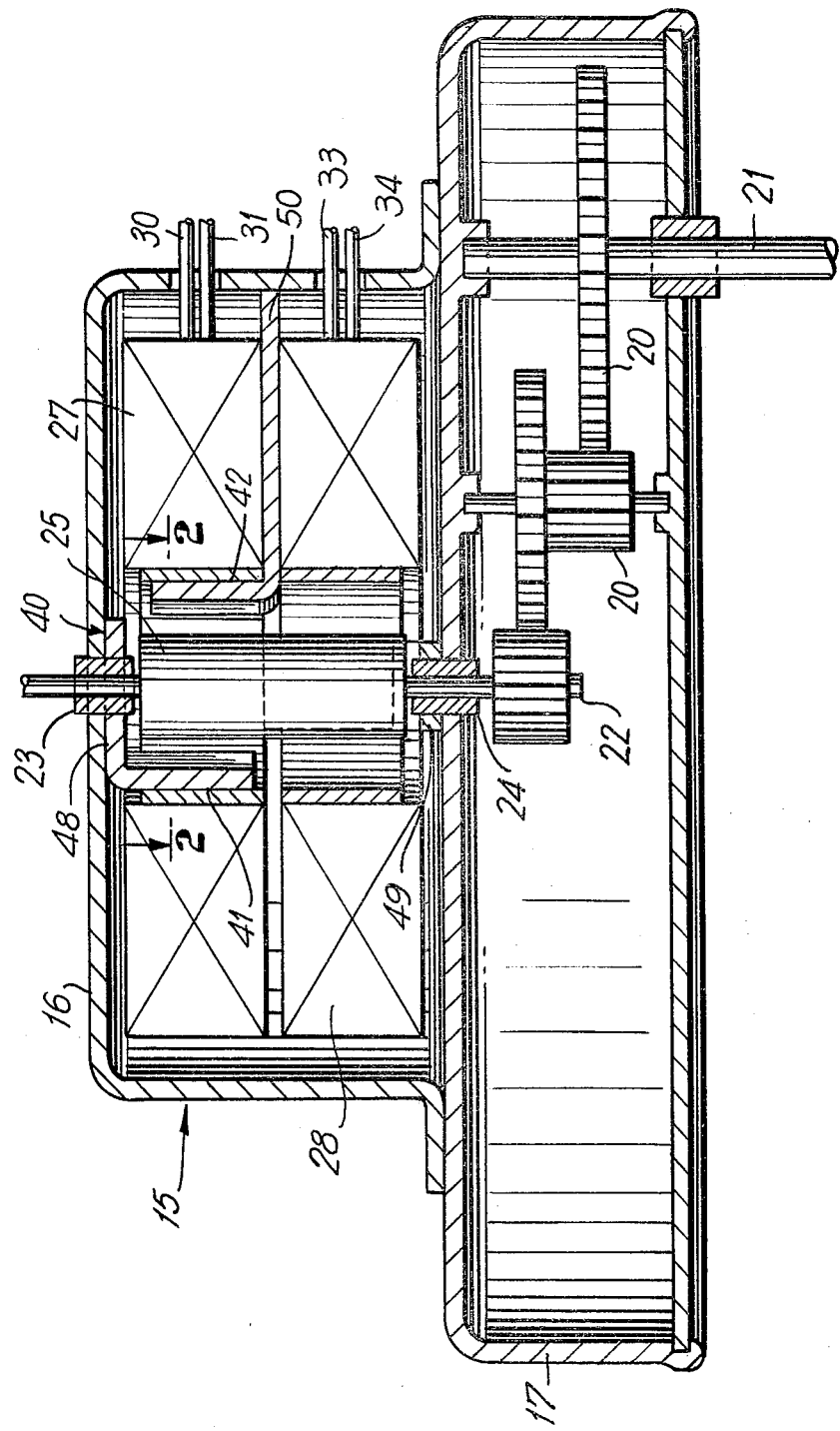
FIG. 1 is a vertical sectional view of a two-phase electric motor in accordance with one illustrative embodiment of the invention.

Referring to FIG. 1 of the drawings, there is shown a two-phase alternating current synchronous motor which includes a motor housing indicated generally at 15. The housing comprises a cup-shaped cover 16 which is suitably secured to a gear box 17. Both the cover 16 and the gear box 17 are of magnetic material, such as cold rolled steel, which has high permeability so as to form low reluctance magnetic flux paths. The gear box 17 encloses a series of reduction gears 20 to provide an appropriate speed reduction at an output shaft 21. The reduction gears are driven by a rotor shaft 22 which is journaled in bushings 23 and 24 in the cover 16 and the gear box 17, respectively.

The shaft 22 supports a thin cylindrical nonsalient pole rotor 25. The rotor 25 is provided with an axial hole into which the shaft 22 is secured as by cementing, molding or other suitable techniques. The rotor 25 comprises a long thin cylinder of ceramic magnetic material which is magnetized permanently with opposite north and south poles, as indicated by N and S in FIG. 2. A relatively "hard" material is used so as to have high coercivity, low permeability, a low specific gravity and a high magnetic energy product. For best results, the magnetic energy product of the rotor material should be at least about $3.0 \times 10^6$ gauss-oersteds along the axis of magnetic orientation. Representative examples of such materials are Ceramagnet A, A19 and A70 manufactured by Stackpole Carbon Company, Electronic Components Division, St. Marys, Pa., and Indox I and Indox V manufactured by Indiana General Corporation, Valparaiso, Ind. They are of anisotropic barium ferrite having a composition $BaF_{12}O_{19}$. Another suitable material is Plastiform available from the Leyman Corporation, Cincinnati, Ohio. The rotor also may be fabricated from a 77% platinum, 23% cobalt material made by The Hamilton Watch Company of Lancaster, Pa. This latter material has a residual induction of 6,400 gauss, a coercive force of 4300 oersteds and a maximum energy product of $9.0 \times 16^6$ gauss-oersteds.

In many prior two-phase motors there are a comparatively large number of rotor poles. Such motors require a substantial circumferential area of rotor surface to provide room for these poles in order to have a useful torque output. The rotor accordingly must have a relatively large diameter when compared with its length. The rotational inertia of the rotor varies directly as the fourth power of its diameter, and thus a large diameter rotor will have a greater rotational inertia than a thin rotor. Large rotational inertia in the rotor is a particular disadvantage in a two-phase motor, in which only a portion of the rotor produces useful torque in response to each electrical impulse.

In a preferred embodiment of this invention, there are employed only two nonsalient poles on the rotor. This allows the use of a very thin cylindrical structure for the rotor which results in low rotational inertia. The rotor has the capability of starting and stopping substantially instantaneously, and it reaches synchronous speed within the first one-half cycle of the applied wave form. To achieve these results the ratio of rotor length to diameter is at least about 2.5 to 1, and because of space and field coil efficiency considerations this ratio should not exceed 4 to 1. The net usable torque falls off markedly when the ratio drops below 2.5 to 1.

Mounted in coaxial relationship with the rotor 25 are two field coils 27 and 28. The coils 27 and 28, which may be identical, are disposed within the housing 15 in axially spaced relationship with each other. The coil 27 includes a pair of leads 30 and 31 which extend through the cover portion 16 of the housing, and the coil 28 similarly includes a pair of leads 33 and 34 which likewise extend through the cover 16.

Figure 2:
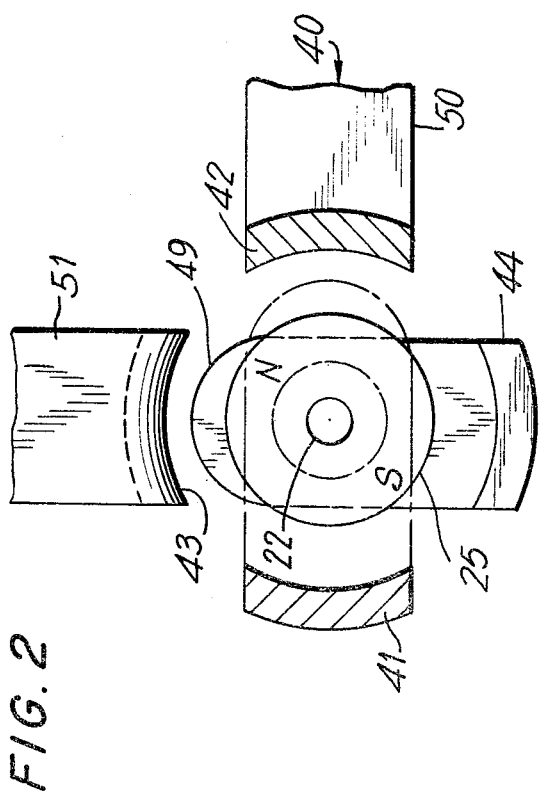
FIG. 2 is a fragmentary sectional view taken along the line 2—2 in FIG. 1.

In addition to the field coils 27 and 28, the stator structure of the motor includes a stator pole piece assembly 40. The assembly 40 comprises four physically separate salient stator poles 41, 42, 43 and 44 which extend in directions parallel to the axis of the rotor 25. As best shown in FIG. 2, the stator poles 41 and 42 are arranged on opposite sides of the rotor 25 with a spacing of one hundred and eighty electrical degrees between the poles, and the stator poles 43 and 44 similarly are oppositely disposed with a one hundred and eighty electrical dgreees spacing therebetween. The poles 41 and 42 cooperate with the field coil 27 and are in magnetic flux relationship with the upper portion of the rotor 25, as viewed in FIG. 1, while the stator poles 43 and 44 cooperate with the field coil 28 and are in magnetic flux relationship with the lower portion of the rotor, as viewed in this figure. The poles 41 and 42 comprise a first set of salient stator poles which is spaced ninety electrical dgrees from the second set of salient stator poles comprising the poles 43 and 44. For a motor of the type shown having only two stator poles in each of the two sets, the poles in each set are spaced one hundred and eighty mechanical degrees apart and ninety mechanical degrees from the poles in the other set.

Figure 3:
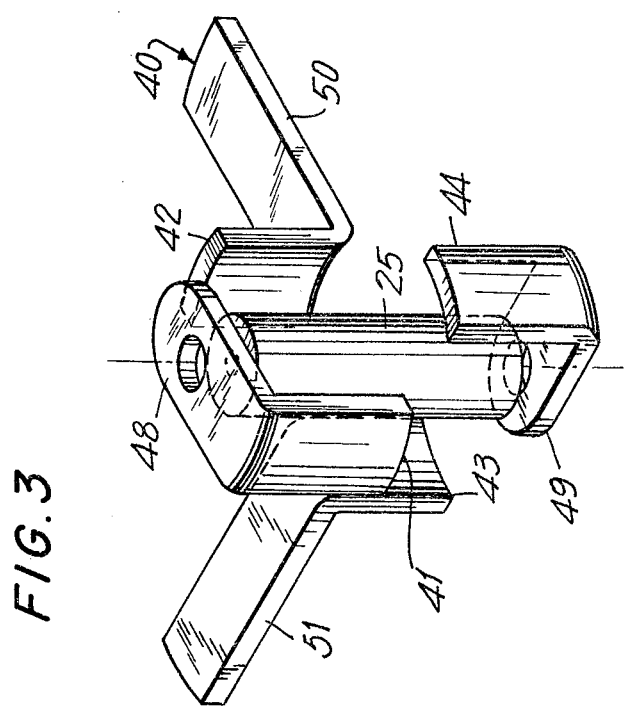
FIG. 3 is a perspective view of the portion of the motor illustrated in FIG. 2.

As best shown in FIG. 3, each of the salient stator poles 41, 42, 43 and 44 is of L-shaped configuration. The poles 41 and 44 are supported adjacent opposite ends of the rotor 25 and include integrally formed radial extensions 48 and 49, respectively, in abutting flux transmitting relationship with the housing 15 (FIG. 1). The upper surface of the extension 48 bears against the cover portion 16 of the housing and includes a suitable opening for the rotor shaft 22, while the lower surface of the extension 49 bears against the gear box portion 17 of the housing and likewise is provided with an opening for the rotor shaft. Respective radial extensions 50 and 51 on the stator poles 42 and 43 are somewhat longer than the extensions 48 and 49 and are located in the space between the field coils 27 and 28. The extensions 50 and 51 extend outwardly from the axis of the rotor and abut the inner cylindrical surface of the cover 16.

Each of the stator poles 41, 42, 43 and 44 is fabricated from a flat strip of cold rolled steel or other magnetically conductive material. The poles are bent to form the radial extensions 48, 49, 50 and 51, and these extensions likewise are of flat rectangular configuration. As best illustrated in FIG. 2, the remaining portions of the poles, that is, the axially extending portions, are provided with a slight curvature to conform with the curvature of the cylindrical surface of the rotor.

In the quiescent position of the rotor 25 (the position shown in FIG. 2), the nonsalient rotor poles are located intermediate the respective sets of stator poles 41, 42, 43 and 44. An important advantage of this quiescent position is that, because of the ninety degree spacing between the two sets of stator poles, when the stator is energized the motor is self-starting. In addition, the quiescent rotor position is particularly desirable from the standpoint of producing high starting torque.

The field coils 27 and 28 are supplied with alternating current signals which are out of phase with each other by at least approximately ninety degrees. Because of the unique arrangement of the stator poles, the rotor automatically begins to rotate from its quiescent position and reaches synchronous speed within the first one-half cycle of the applied wave form.

The direction of rotation of the rotor is determined by the polarity of the first one-quarter cycle of the applied wave. If the initial flux from the stator pole 43 is of north (N) polarity, for example, and is followed one-quarter cycle later by north polarity flux from the stator pole 42, the flux from the stator pole 44 will simultaneously be of south (S) polarity and will be followed one-quarter cycle later by south polarity flux from the stator pole 41. Under these conditions the rotor will begin rotating in a clockwise direction, as viewed in FIG. 2. Conversely, if the initial flux from the stator pole 42 is of south polarity and is followed one-quarter cycle later by south polarity flux from the stator pole 42, the rotor will begin turning in a counterclockwise direction. In cases in which unidirectional rotation is desired, any of several conventional mechanical "no back" devices may be employed, or various known nonmechanical arrangements may be utilized.

As the rotor 25 rotates, the rotor flux changes between successive magnetic paths depending upon the polarity of the individual stator poles. Because of the unique arrangement of the stator poles, at all times during the operation of the rotor the flux follows a low reluctance, closed return path as it proceeds along the stator structure. The flux at any given instant passes from the north pole of the rotor, across the uniform air gap between the rotor and one or more of the stator poles, and it then returns along the stator pole, the integrally formed radial extension on the stator pole and the magnetic housing 15 to the south pole of the rotor. As a result of the abutting relationship between the stator pole extensions and the housing, the magnetic reluctance is the same at each point along the stator structure. When the field coils 27 and 28 are deenergized, the rotor consistently stops in a position in which the two rotor poles are intermediate the two sets of stator poles.

Figure 4:
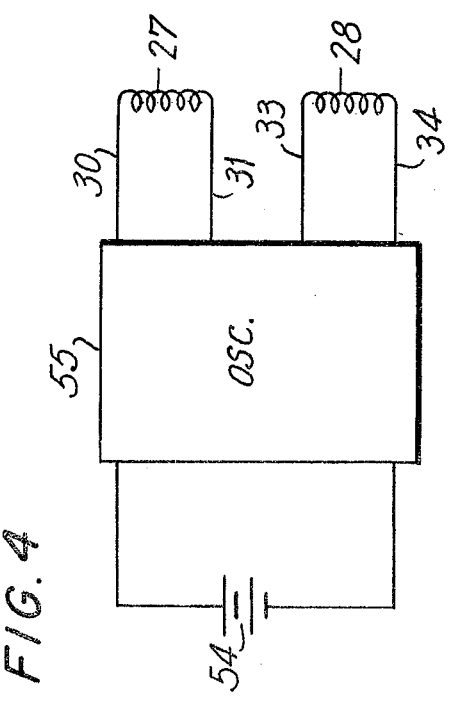
FIG. 4 is a schematic diagram of an electrical circuit for the motor.

FIG. 4 is illustrative of a schematic electrical diagram for operating the motor from a battery 54 or other source of direct current. The battery is connected to an oscillator circuit 55 which operates in known manner to supply two-phase alternating current to the leads 30, 31, 33 and 34 for the field coils 27 and 28. The current supplied to the leads 30 and 31 is ninety degrees out of phase with respect to the current supplied to the leads 33 and 34 to provide a similar phase differential between the field coils 27 and 28.

Figure 5:
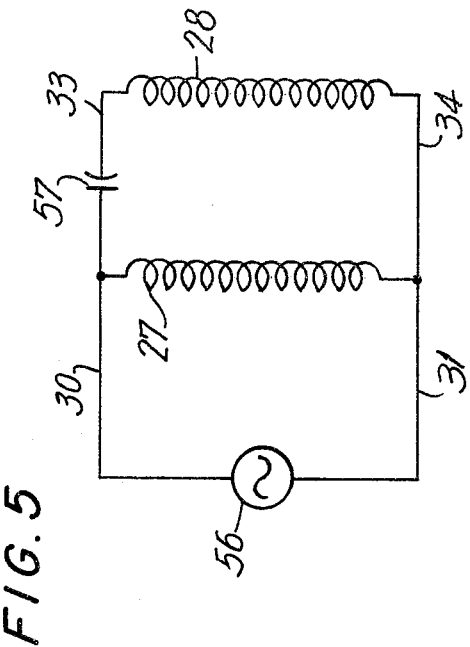
FIG. 5 is a schematic diagram of another electrical circuit for the motor.

In cases in which the motor is to be driven from a single-phase source of alternating current, a conventional capacitor circuit may be employed. Referring to FIG. 5, for example, there is shown an alternating current source 56 which is connected across the leads 30 and 31 for the field coil 27. One terminal of the coil 27 is connected through a capacitor 57 to the lead 33 for the field coil 28, and the other terminal of the coil 27 is connected to the remaining field coil lead 34. The arrangement of the capacitor 57 in series with the coil 28 produces the desired phase shift between the currents in the two coils. In a simplified circuit of the type illustrated in FIG. 5, the phase shift may not be precisely ninety degrees, but by selecting appropriate circuit parameters it is sufficiently close that the motor will operate in the manner described above.

Referring now to FIGS. 6–8, there is shown a two-phase alternating current motor in accordance with another illustrative embodiment of the invention. The motor of these latter figures in some respects is similar to the motor of FIGS. 1–3 and includes the thin cylindrical rotor 25 having only a single pair of nonsalient rotor poles, the housing 15, and the field coils 27 and 28. As in the case of the previously described motor, the stator assembly 60 of the motor of FIGS. 6–8 is provided with a first set of salient stator poles 61 and 62 which cooperate with the field coil 27 and a set of salient stator poles 63 and 64 which cooperate with the field coil 28. The stator poles in the respective sets are angularly spaced apart by approximately ninety electrical and mechanical degrees and are in magnetic flux relationship with different portions of the rotor.

Contrary to the motor of FIGS. 1–3, however, in the motor of FIGS. 6–8 the salient stator pole 62 in the first set and the salient stator pole 63 in the second set are in integral one-piece relationship with each other. The poles 62 and 63 extend in opposite directions from a tubular pole piece member 65. The member 65 is of magnetic material, and its opposed ends are cut away to form the poles 62 and 63 such that each of these poles subtends an angle which is in the neighborhood of one hundred and fifty degrees. As in the previously described embodiment, the poles 62 and 63 extend in directions parallel to the rotational axis of the rotor 25 and are spaced ninety electrical and mechanical degrees apart.

An annular disc 67 is interposed between the field coils 27 and 28. The disc 67 is of magnetic material, and its outer periphery abuts the inner cylindrical surface of the cover portion 16 of the housing 15. The inner periphery of the disc 67 is spot welded or otherwise affixed to the tubular pole piece member 65 to maintain the member 65 in position around the rotor 25.

The salient stator pole 61 in the first set of poles and the salient stator pole 64 in the second set of poles are of L-shaped configuration and include respective integral extensions 70 and 71. The overall configuration of the stator poles 61 and 64 for the most part corresponds to that of the stator poles 41 and 44 in the motor of FIGS. 1–3, although the poles 61 and 64 subtend a somewhat larger angle with respect to the axis of the rotor 25. This angle is approximately one hundred and fifty degrees and is the same as the angle subtended by the poles 62 and 63 on the pole piece member 65.

The motor of FIGS. 6–8 operates in a manner similar to that described heretofore in response to the application of two-phase alternating current to the field coils 27 and 28 from an electrical circuit such as that shown in FIGS. 4 or 5. Upon the energization of the field coils, an alternating magnetic flux field is produced in each of the sets of stator poles 61 and 62, and 63 and 64, with the flux in the stator poles 61 and 62 being ninety degrees out of phase with the flux in the stator poles 63 and 64. The rotor 25 exhibits a self-starting characteristic upon the energization of the field coils, and it begins rotating and reaches synchronous speed within the first one-half cycle of the applied wave form.

Each of the above described embodiments of the invention has a uniform air gap between the rotor and the stator poles. That is, the spacing between the periphery of the rotor and all of the stator poles in the motor is the same. The motor's self-starting characteristic is achieved without the use of shaded stator poles or other ancillary starting devices.

The motor in accordance with each of the illustrated embodiments of the invention is of round configuration and includes a thin cylindrical nonsalient pole rotor having only a single pair of rotor poles of alternate polarity. The motor employs a total of only four salient stator poles which are arranged in two distinct sets of poles. The two stator poles in one of the sets are in magnetic flux relationship with one portion of the rotor, and the two stator poles in the remaining set are in magnetic flux relationship with a different portion of the rotor. The motor exhibits high torque and cool running characteristics and is readily sealable in a compact unit.

The terms and expressions which have been employed are terms of description and not of limitation, and there is no intention in the use of such terms and expressions of excluding any equivalents of the features shown and described or portions thereof, but it is recognized that various modifications are possible within the scope of the invention claimed.

What is claimed is:

1. An electric rotating machine comprising, in combination:

a thin cylindrical nonsalient pole rotor having a pair of rotor poles;

first and second field coils in coaxial relationship with each other and with the rotor;

a housing of magnetic material at least substantially enclosing the first and second field coils;

a stator pole piece assembly within the housing and externally disposed with respect to said rotor, the pole piece assembly having first and second sets of salient stator poles respectively cooperating with the first and second field coils, there being not more than two salient stator poles in each of said sets and the stator poles in the respective sets being angularly spaced apart by approximately ninety electrical degrees, each of said stator poles being in magnetic flux relationship with said pair of rotor poles, at least two of the stator poles being of L-shaped configuration with one of the arms of the "L" forming a radial extension in flux transmitting relationship with the housing, the radial extensions of said two L-shaped stator poles being rectangular and extending outwardly from adjacent the rotor to said housing with their outer ends abutting the inner wall of said housing; and means for applying current to the first and second field coils to produce an alternating magnetic flux field in each of said sets of stator poles.

2. An electric rotating machine as defined in claim 1, in which each of the salient stator poles in the machine is of L-shaped configuration.

3. An electric rotating machine as defined in claim 1, in which one of the salient stator poles in the first set and one of the salient stator poles in the second set are in integral one-piece relationship with each other.

4. An electric rotating machine comprising, in combination:

a thin cylindrical nonsalient pole rotor having only a single pair of rotor poles;

first and second field coils coaxially disposed around the rotor in axially spaced relationship with each other;

a cylindrical housing of magnetic material at least substantially enclosing the first and second field coils;

a stator pole piece assembly within the housing and having first and second sets of salient stator poles respectively cooperating with the first and second field coils, there being not more than two salient stator poles in each of said sets and the stator poles in the respective sets being angularly spaced apart by approximately ninety electrical degrees, each of said stator poles being in magnetic flux relationship with said pair of rotor poles with a uniform radial air gap between the rotor and all of the stator poles, at least two of the stator poles being of L-shaped configuration with one of the arms of the "L" forming a rectangular radial extension extending outwardly from adjacent the rotor to said housing with its free outer end in abutting flux transmitting relationship with the inner cylindrical wall of the housing; and means for applying current to the first and second field coils to produce an alternating magnetic flux field in each of said sets of stator poles, the current in one of said field coils being out of phase with the current in the other field coil, to provide said rotor with a self-starting characteristic.

5. An electric rotating machine as defined in claim 4, in which each of the stator poles in the machine has an integrally formed radial extension in abutting flux transmitting relationship with the housing.

6. An electric rotating machine comprising, in combination:

a rotor having a pair of rotor poles;

a stator pole piece assembly including a tubular member surrounding the central portion of the rotor and first and second sets of salient stator poles in magnetic flux relationship with said rotor, one of the salient stator poles in each of said sets extending in opposite directions from the respective ends of the tubular member and cooperating with different axial portions of the rotor;

field coil means surrounding said tubular member for supplying magnetic flux to the respective sets of salient stator poles; and means for applying current to the field coil means to produce a magnetic flux field in each of said sets of stator poles.

7. An electric rotating machine as defined in claim 6, in which said one salient stator pole in each of said sets is in integral one-piece relationship with said tubular member.

8. An electric rotating machine comprising, in combination:

a cylindrical rotor having a pair of rotor poles;

first and second field coils in coaxial relationship with each other and with the rotor;

a housing at least substantially enclosing the first and second field coils;

a stator pole piece assembly including a tubular member within said field coils and coaxial with the axis of rotation of the rotor and first and second sets of salient stator poles respectively cooperating with the first and second field coils, one of the salient stator poles in each of said sets extending in opposite directions from the tubular member and cooperating with different axial portions of the rotor, said tubular member surrounding said rotor and being positioned between the rotor and the field coils; and means for applying current to the first and second field coils to produce a magnetic flux field in each of said sets of stator poles, the current in one of said field coils being out of phase with the current in the other field coil, to provide said rotor with a self-starting characteristic.

9. An electric rotating machine comprising, in combination:
   a cylindrical nonsalient pole rotor having a pair of rotor poles;
   first and second field coils coaxially disposed around the rotor in axially spaced relationship with each other;
   a housing of magnetic material at least substantially enclosing the first and second field coils;
   a stator pole piece assembly within the housing and including a tubular member within said field coils and coaxial with the axis of rotation of the rotor and first and second sets of salient stator poles respectively cooperating with the first and second field coils, there being not more than two salient stator poles in each of said sets and the stator poles in the respective sets being angularly spaced apart by approximately ninety electrical degrees, each of said stator poles being in magnetic flux relationship with said pair of rotor poles with a uniform radial air gap between the rotor and all of the stator poles, one of the salient stator poles in each of said sets extending in opposite directions from the tubular member and cooperating with different axial portions of the rotor, said tubular member surrounding said rotor and being positioned between the rotor and the field coils; and
   means for applying current to the first and second field coils to produce an alternating magnetic flux field in each of said sets of stator poles, the current in one of said field coils being out of phase with the current in the other field coil, to provide said rotor with a self-starting characterisitc.

10. An electric rotating machine comprising, in combination:
    a thin cylindrical nonsalient pole rotor having only a single pair of rotor poles and a length to diameter ratio of at least about 2.5 to 1;
    first and second field coils coaxially disposed around the rotor in axially spaced relationship with each other;
    a housing of magnetic material at least substantially enclosing the first and second field coils;
    a stator pole piece assembly within the housing and including a tubular member within said field coils and coaxial with the axis of rotation of the rotor and first and second sets of salient stator poles respectively cooperating with the first and second field coils; said tubular member surrounding said rotor and being positioned between the rotor and the field coils, there being two salient stator poles in each of said sets and the stator poles in the respective sets being angularly spaced apart by approximately ninety electrical degrees, the stator poles in each of said sets being angularly spaced apart by approximately one hundred and eighty electrical degrees, each of said stator poles being in magnetic flux relationship with said pair of rotor poles with a uniform radial air gap between the rotor and all of the stator poles, one of the salient stator poles in each of said sets extending in opposite directions from the tubular member and cooperating with different axial portions of the rotor; and
    means for applying current to the first and second field coils to produce a magnetic flux field in each of said sets of stator poles, the current in one of said field coils being out of phase with the current in the other field coil, to provide said rotor with a self-starting characteristic.

11. An electric rotating machine comprising, in combination:
    a thin cylindrical nonsalient pole rotor having only a single pair of rotor poles and a length to diameter ratio of at least about 2.5 to 1;
    first and second field coils coaxially disposed around the rotor in axially spaced relationship with each other;
    a housing of magnetic material at least substantially enclosing the first and second field coils;
    a stator pole piece assembly within the housing and including a tubular member within said field coils and coaxial with the axis of rotation of the rotor and first and second sets of salient stator poles respectively cooperating with the first and second field coils, there being not more than two salient stator poles in each of said sets and the stator poles in the respective sets being angularly spaced apart by ninety electrical degrees, each of said stator poles being in magnetic flux relationship with said pair of rotor poles with a uniform radial air gap between the rotor and all of the stator poles, two of the stator poles being of L-shaped configuration with one of the arms of the "L" forming a rectangular radial extension extending outwardly from adjacent the rotor to said housing with its free outer end in abutting flux transmitting relationship with the inner wall of the housing and the remaining two stator poles being integrally formed with the tubular member and extending in opposite directions therefrom in magnetic flux relationship with different axial portions of the rotor; and
    means for applying current to the first and second field coils to produce an alternating magnetic flux field in each of said sets of stator poles, the current in one of said field coils being out of phase with the current in the other field coil, to provide said rotor with a self-starting characteristic.

* * * * *